United States Patent
Lee

(10) Patent No.: US 7,817,339 B2
(45) Date of Patent: Oct. 19, 2010

(54) DISPLAY PANEL FOR 3-DIMENSIONAL DISPLAY DEVICE AND 3-DIMENSIONAL DISPLAY DEVICE COMPRISING THE SAME

(75) Inventor: Byoung Joo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 253 days.

(21) Appl. No.: 11/603,170

(22) Filed: Nov. 22, 2006

(65) Prior Publication Data
US 2007/0152997 A1    Jul. 5, 2007

(30) Foreign Application Priority Data
Dec. 30, 2005   (KR) .................. 10-2005-0134717

(51) Int. Cl.
*G02B 27/22* (2006.01)
(52) U.S. Cl. .................. 359/464; 359/463; 348/54; 348/59
(58) Field of Classification Search .................. None
See application file for complete search history.

(56) References Cited

U.S. PATENT DOCUMENTS

| | | | | |
|---|---|---|---|---|
| 5,428,366 A | * | 6/1995 | Eichenlaub | 345/102 |
| 6,307,585 B1 | * | 10/2001 | Hentschke | 348/51 |
| 6,396,873 B1 | * | 5/2002 | Goldstein et al. | 375/240 |
| 2003/0011884 A1 | * | 1/2003 | Van Berkel | 359/464 |
| 2003/0052836 A1 | | 3/2003 | Matsumoto et al. | |
| 2005/0259323 A1 | * | 11/2005 | Fukushima et al. | 359/462 |
| 2006/0285206 A1 | * | 12/2006 | Tzschoppe | 359/465 |
| 2007/0041095 A1 | * | 2/2007 | Nakaya et al. | 359/463 |

FOREIGN PATENT DOCUMENTS

CN     1425267 A     6/2003

OTHER PUBLICATIONS

Cho et al., "Analysis on the Effect of Color Dispersion Compensating layer in the Three-Dimensional/Two-Dimensional Convertible Display Based on Parallax Barrier", IMID '05 Digest, pp. 1-4.

* cited by examiner

*Primary Examiner*—Lee Fineman
(74) *Attorney, Agent, or Firm*—Birch, Stewart, Kolasch & Birch LLP

(57) ABSTRACT

A display panel for a 3-dimensional display device is provided. The display panel includes a plurality of unit pixels arranged in a matrix form having a row and column with each unit pixel including a plurality of sub-pixels. Further, the plurality of unit pixels form each of a plurality of pixels alternately arranged with each other for a viewer's left eye and pixels for the viewer's right eye. In addition, at least one unit pixel has a different arrangement of sub-pixels than another unit pixel.

5 Claims, 21 Drawing Sheets

Fig. 3
(Related Art)
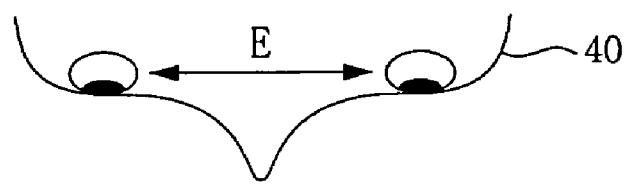
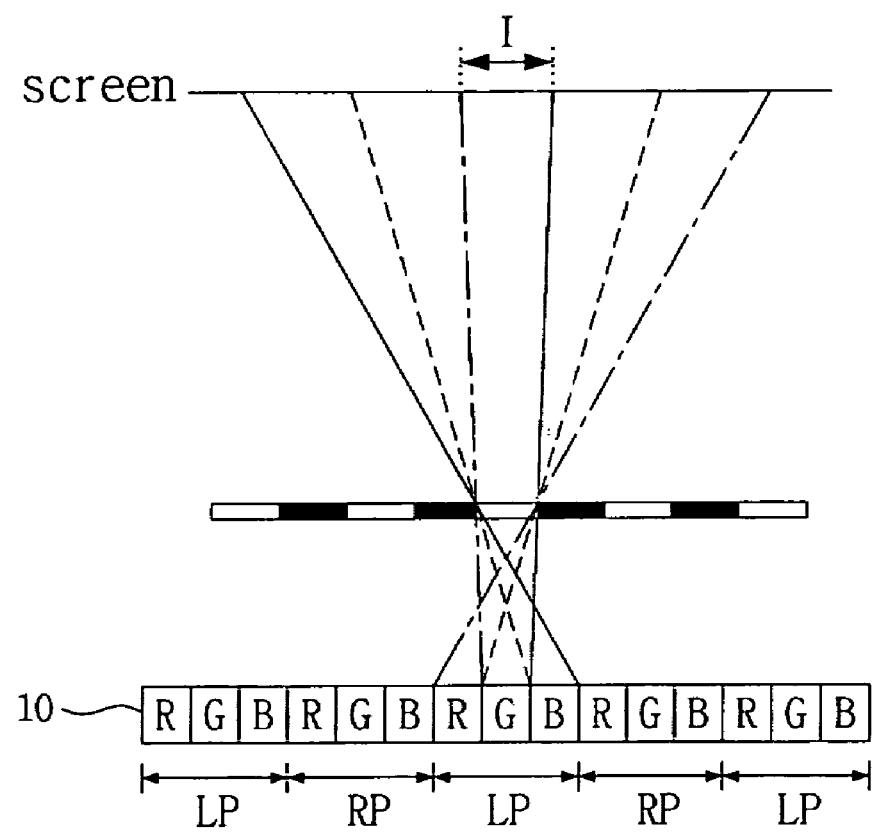

DISPLAY PANEL FOR 3-DIMENSIONAL DISPLAY DEVICE AND 3-DIMENSIONAL DISPLAY DEVICE COMPRISING THE SAME

This nonprovisional application claims priority under 35 U.S.C. §119(a) to Patent Application No. 2005-0134717 filed in the Republic of Korea on Dec. 30, 2005, the entire contents of which are hereby incorporated by reference.

BACKGROUND OF THE INVENTION

1. Field of the Invention

The present invention relates to a display panel for a 3-dimensional display device and a corresponding method.

2. Description of the Related Art

In general, a viewer can see a 3-dimensional image using the principle of stereoscopy. That is, the viewer sees two different 2-dimensional images through his or her left and right eyes. The viewer's brain then blends the different 2-dimensional images such that the viewer sees a 3-dimensional image.

In more detail, people are capable of seeing in three dimensions primarily because they have binocular vision. Binocular vision occurs when two eyes look at the same thing at a slightly different angle, resulting in two slightly different images. Therefore, a viewer's binocular disparity is an important factor when providing a 3-dimensional effect.

A method for displaying 3-dimensional images according to the related art includes a 3-dimensional display in which the user wears special glasses, an autostereoscopic 3-dimensional display, and a holographic display. The autostereoscopic 3-dimensional display type is the most popular because the viewer doesn't have to wear separate glasses.

In addition, the autostereoscopic 3-dimensional display type is classified into various sub-types. For example, one type implements a virtual 3-dimensional image through an optical illusion using stereo images (i.e., uses a parallax barrier). For example, FIG. 1 is an overview illustrating a principle of implementing a 3-dimensional image using a parallax barrier in a 3-dimensional display device 1 according to a related art.

As shown in FIG. 1, the related art 3-dimensional display device 1 includes a display panel 10, a backlight unit 20 and a parallax barrier 30. The display panel 10 displays a 2-dimensional image using light from the backlight unit 20. For this purpose, the display panel 10 includes pixels for the viewer's left eye (LP) and pixels for the viewer's right eye (RP) (hereinafter referred to as LPs (left eye pixels) and RPs (right eye pixels)). As shown, the LPs and RPs are alternately arranged with respect to each other.

In addition, the LPs and RPs transmit light from the backlight unit 20 to the viewer 40. Further, the LPs refer to pixels displaying a 2-dimensional image viewed only through the left eye 42 of the viewer 40, and the RPs refer to pixels displaying a 2-dimensional image viewed only through the right eye 44 of the viewer 40. Thus, in this instance, the viewer 40 recognizes a 3-dimensional image because their brain blends the 2-dimensional images viewed with the left and right eyes 42 and 44.

In addition, as shown in FIG. 1, the backlight unit 20 is arranged at a rear surface of the display panel 10, and supplies light toward the display panel 10. The parallax barrier 30 is arranged at the front surface of the display panel 10 (i.e. between the display panel 10 and the viewer 40). Further, the parallax barrier 30 is used to allow the viewer 40 to recognize the 2-dimensional image provided from the display panel 10 as a 3-dimensional image.

In more detail, the parallax barrier 30 allows light that has passed through the LPs to only enter the left eye 42 and light that has passed through the RPs to only enter the right eye 44. That is, the parallax barrier 30 includes barriers 32 spaced apart from each other at a constant interval, and slits 34 between adjacent barriers 32.

As shown, the barriers 32 prevent light LL2 that passed through the LPs from entering the right eye 44, and prevents light RL2 that passed through the RPs from entering the left eye 42. Thus, the light LL1 that passed through the LPs can enter only the left eye 42 through the slits 34, and the light RL1 that passed through the RLs can enter only the right eye 44 through the slits 34. At this time, disparity information according to the viewer's binocular disparity is generated between the light LL1 entering the left eye 42 of viewer 40 and the light RL1 entering the right eye RL1 of viewer 40. Therefore, the viewer 40 can view 3-dimensional images.

Next, FIG. 2 is an overview illustrating an arrangement of sub-pixels of the display panel 10 in the 3-dimensional display device 1 shown in FIG. 1. As shown in FIG. 2, the display panel 10 includes R, G and B sub-pixels that are arranged in the same order for each unit pixel 12. That is, the Red/Green/Blue R, G and B sub-pixels are repeated in a same pattern in the row and column directions. Further, as shown, the unit pixel 12 includes Red/Green/Blue R, G and B sub-pixels.

Further, the LPs and RPs may be provided in a one-to-one correspondence to the R, G and B sub-pixels. Alternatively, the LPs and RPs may be provided in a one-to-one correspondence to a unit pixel 12 of the display panel 10.

Accordingly, and with reference to FIGS. 2 and 4, the LPs and RPs are provided in a one-to-one correspondence to the unit pixel 12 of the display panel 10 to thereby maintain a proper viewing distance. Further, the expression that "the unit of 3-dimensional image is the unit pixel 12" means that each of the LPs and RPs are provided in a one-to-one correspondence to the unit pixel 12.

However, if the LPs and RPs are provided in a one-to-one correspondence to the unit pixel 12, the region where Red/Green/Blue colors can be observed at the same time is confined to the 'I' region. Thus, this second method reduces each visible region compared to the method in which the LPs and RPs are provided in a one-to-one correspondence with the R, G and B sub-pixels.

In addition, in the method shown in FIG. 3, the viewer 40 can not view a blue color B at the right side of 'I' region. Thus, a reddish fault occurs at the right side of 'I' region. Similarly, the viewer 40 can not view a red color R at the left side of the 'I' region. Accordingly, a bluish fault occurs at the left side of 'I' region. This phenomenon refers to a color separation phenomenon, which deteriorates the display quality of the display panel 10.

SUMMARY OF THE INVENTION

Accordingly, one object of the present invention is to address the above-noted and other problems.

Another object of the present invention is to provide an improved display panel and corresponding 3-dimensional display device by reducing or eliminating the color separation phenomenon.

To achieve these and other advantages and in accordance with the purpose of the present invention, as embodied and broadly described herein, the present invention provides in one aspect a novel display panel for a 3-dimensional display device. The display panel includes a plurality of unit pixels arranged in a matrix form having a row and column with each unit pixel including a plurality of sub-pixels. Further, the plurality of unit pixels form each of a plurality of pixels alternately arranged with each other for a viewer's left eye and pixels for the viewer's right eye. In addition, at least one unit pixel has a different arrangement of sub-pixels than another unit pixel. The present invention also provides a corresponding method of manufacturing the display panel.

In another aspect, the present invention provides a 3-dimensional display device including a display panel including a plurality of unit pixels arranged in a matrix form having a row and column, each unit pixel including a plurality of sub-pixels. Further, the plurality of unit pixels are alternately arranged with each other and form each of a plurality of pixels for a viewer's left eye and pixels for the viewer's right eye. In addition, at least one unit pixel has a different arrangement of sub-pixels than another unit pixel. Also included is a light dispersing layer arranged in a front surface of the display panel and configured to allow light that has passed through the pixels for the viewer's left eye among light to enter only the viewer's left eye and light that has passed through the pixels for the viewer's right eye among light to enter only the right eye so that the viewer recognizes a 2-dimensional image provided from the display panel as a 3-dimensional image. The present invention also provides a corresponding method of manufacturing the 3-dimensional display device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIG. 3 is an overview illustrating a principle of implementing a 3-dimensional image in which the LPs and RPs are provided in a one-to-one correspondence with the unit pixel;

DETAILED DESCRIPTION OF THE PREFERRED EMBODIMENTS

Reference will now be made in detail to the preferred embodiments of the present invention, examples of which are illustrated in the accompanying drawings.

Figure 1:
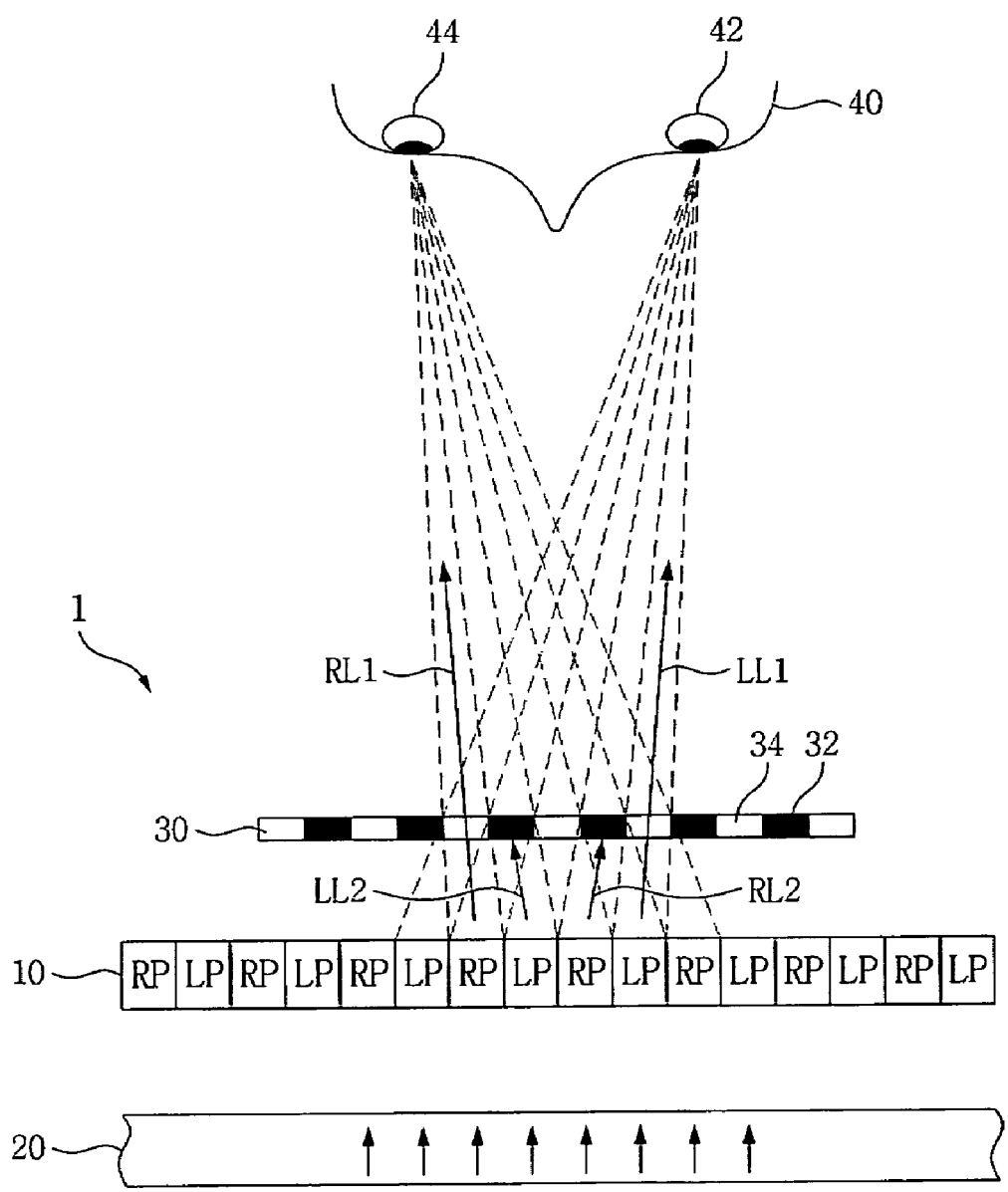
FIG. 1 is an overview illustrating a principle of implementing a 3-dimensional image using a parallax barrier in a related art 3-dimensional display device.
Figure 2:
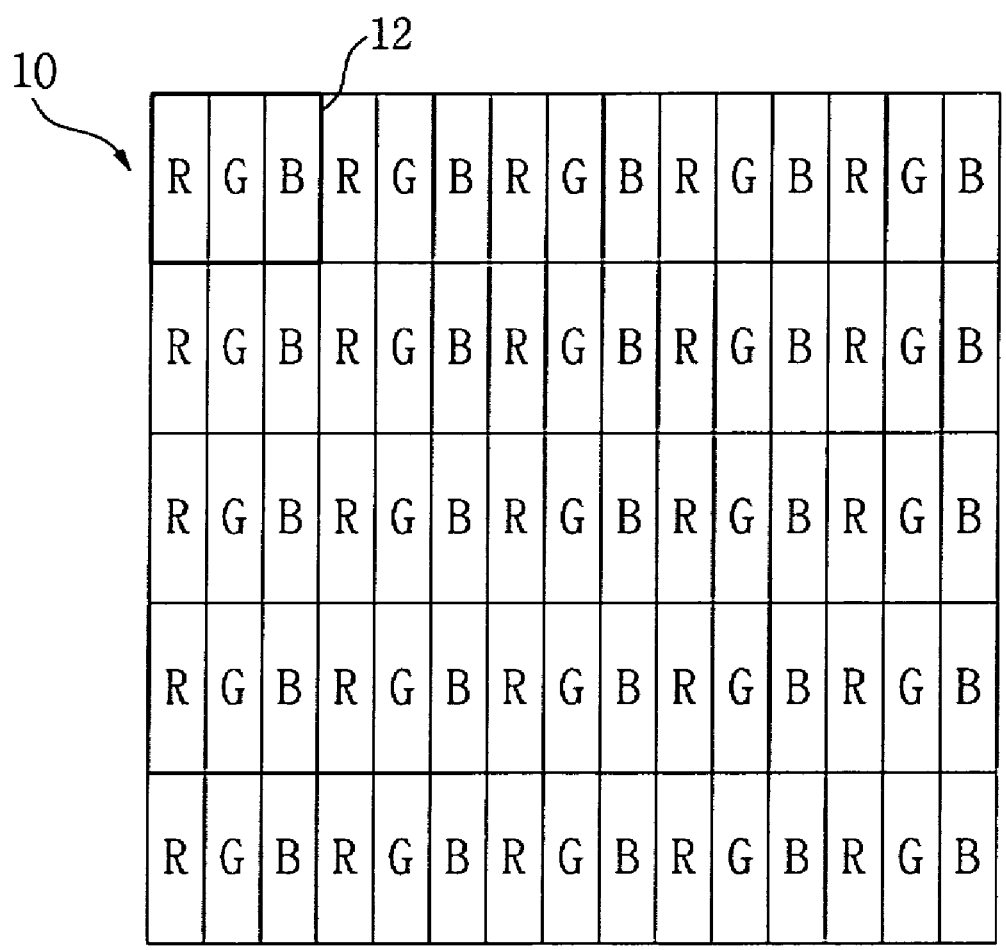
FIG. 2 is an overview illustrating an arrangement order of sub-pixels in the 3-dimensional display device of FIG. 1.
Figure 4:
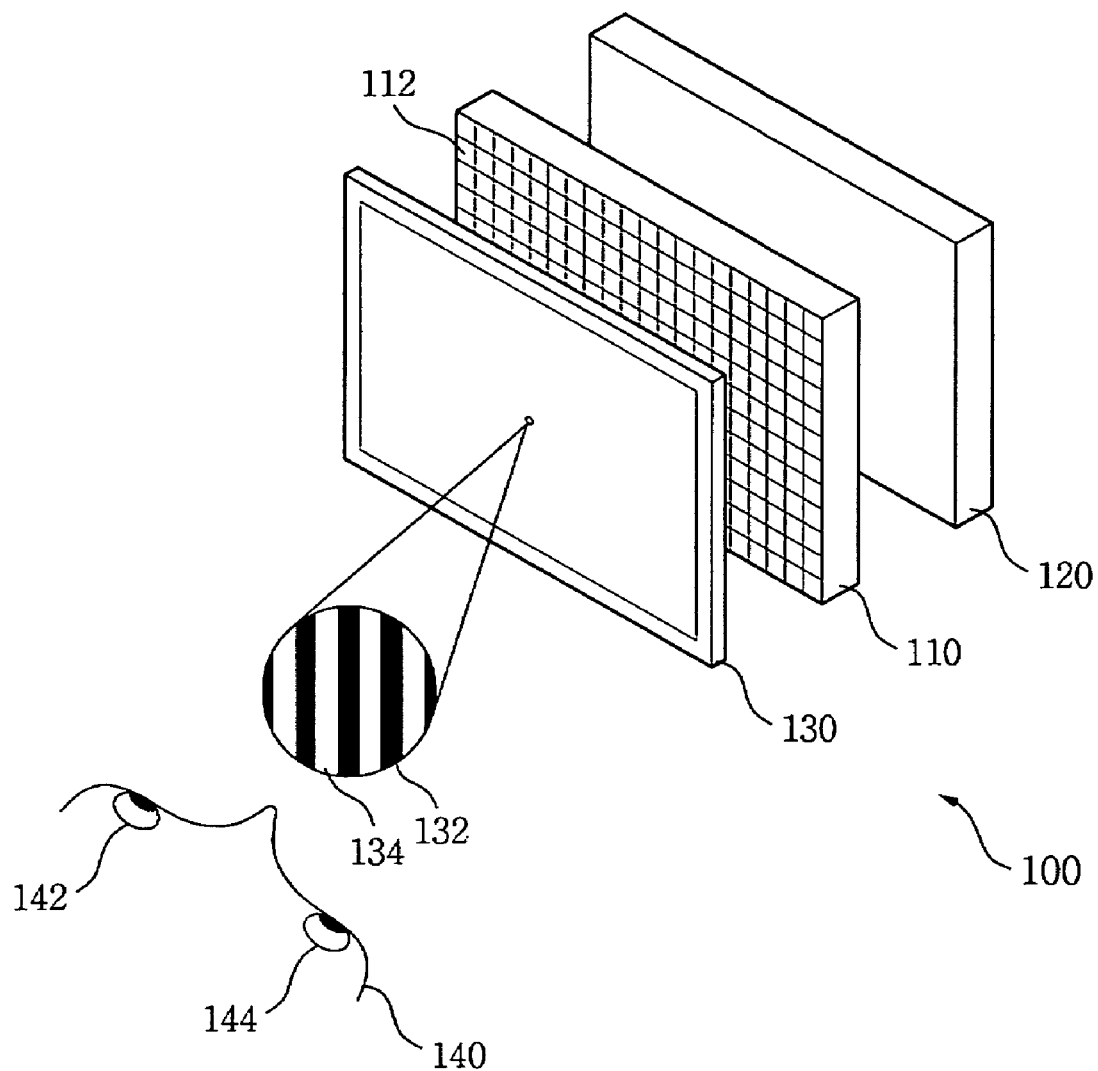
FIG. 4 is a perspective view illustrating a 3-dimensional display device according to an embodiment of the present invention.

Turning first to FIG. 4, which is a perspective view illustrating a 3-dimensional display device 100 according to an embodiment of the present invention. As shown, the 3-dimensional display device 100 includes a display panel 110, a backlight unit 120 and a parallax barrier 130. Further, the display panel 110 includes a plurality of unit pixels 112 for displaying a 2-dimensional image using light from the backlight unit 120.

In addition, the plurality of unit pixels 112 form each of a plurality of LPs and RPs arranged alternately to each other along any one direction (e.g., the column direction) and are composed of a plurality of sub-pixels to be arranged in a matrix form. For example, a unit pixel 112 may include Red/Green/Blue R, G and B sub-pixels, but may also include other arrangements. Further, as described above, the unit of 3-dimensional display may be the unit pixel 112 (i.e., the LPs and RPs are arranged in a one-to-one correspondence with the unit pixel 112).

Also, each LP and RP transmits light from the backlight unit 120 towards the viewer 140. Further, light that has passed through the LPs can only enter the left eye 142 of the viewer 140 and light that has passed through the RPs can only enter the right eye 144 of the viewer 140 due to the parallax barrier 130. As shown in FIG. 4, the backlight unit 120 is arranged at the rear surface of the display panel 110, and supplies light toward the display panel 110.

In addition, the parallax barrier 130 is arranged at the front surface of the display panel 110 (i.e., between the display panel 110 and viewer 140). The parallax barrier 130 is used to allow the viewer 140 to recognize the 2-dimensional image provided from the display panel 110 as a 3-dimensional image. That is, the parallax barrier 130 allows light that has passed through the LPs to enter only the left eye 142 and light that has passed through the RPs to enter only the right eye 144.

Specifically, the parallax barrier 130 as shown in FIG. 4 includes barriers 132 spaced apart from each other at a constant interval with slits 134 provided between the barriers 132. The barriers 132 prevent light that passed through the LPs from entering the right eye 144, and prevents light that passed through the RPs from entering the left eye 142. Therefore, light that has passed through the LPs can only enter the left eye 142 through the slits 134, and light that has passed through the RPs can only enter the right eye 144 through the slits 134.

Figure 5:
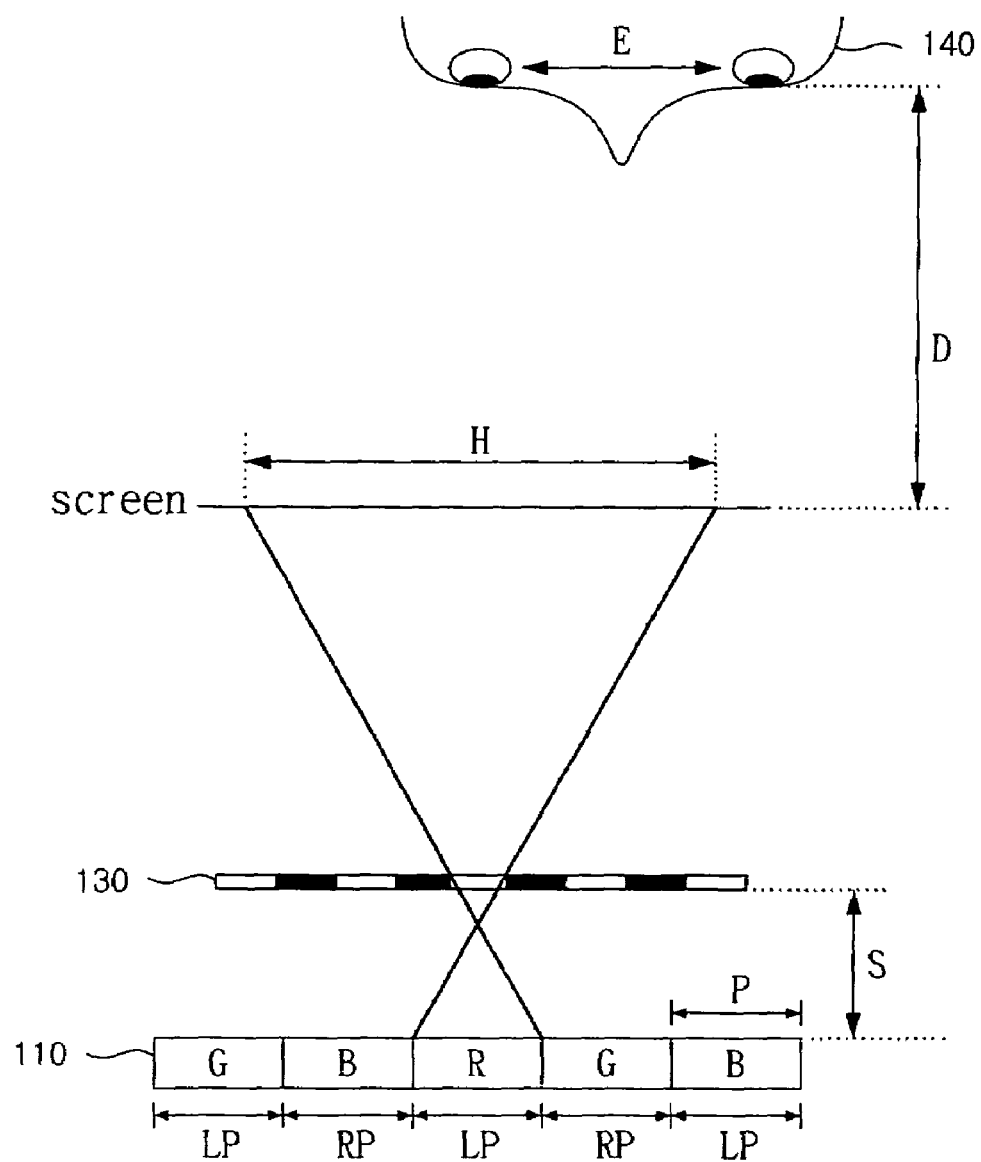
FIG. 5 is an overview illustrating a principle of implementing a 3-dimensional image in which the LPs and RPs are provided in a one-to-one correspondence with the R, G and B sub-pixels.

Turning now to FIG. 5, which is an overview for illustrating a principle of implementing a 3-dimensional image using the sub-pixel arrangement. In more detail, FIG. 5 illustrates how each of the LPs and RPs in the display panel 110 are provided in a one-to-one correspondence with each of the Red/Green/Blue R, G and B sub-pixels.

Thus, as shown in FIG. 5, when the LP is a red sub-pixel R, the RPs adjacent to the LP are a green sub-pixel G and a blue sub-pixel B. Accordingly, in this instance, each of the Red/Green/Blue R, G and B sub-pixels can be a single unit of the 3-dimensional display. Thus, the viewer 140 can observe only one color, e.g. the red color within the entire H section.

In addition, in the related art 3-dimensional display device using the parallax barrier 130, a 3-dimensional viewing distance from which a 3-dimensional image can be viewed is inversely proportionate to the unit magnitude of the 3-dimensional display. That is, the 3-dimensional viewing distance is represented by the following equation:

$$D=(S \times E)/P \quad \text{equation (1)}$$

Here, D represents the 3-dimensional viewing distance, and S represents the distance between the parallax barrier and the display panel. Further, E represents the binocular disparity, and P represents the unit magnitude of the 3-dimensional display.

Therefore, as can be seen in equation (1), if the unit magnitude of the 3-dimensional display decreases, the 3-dimensional viewing distance is lengthened. Accordingly, a high resolution display panel having a relative small unit magnitude is disadvantageous because the 3-dimensional viewing distance is increased.

Figure 6:
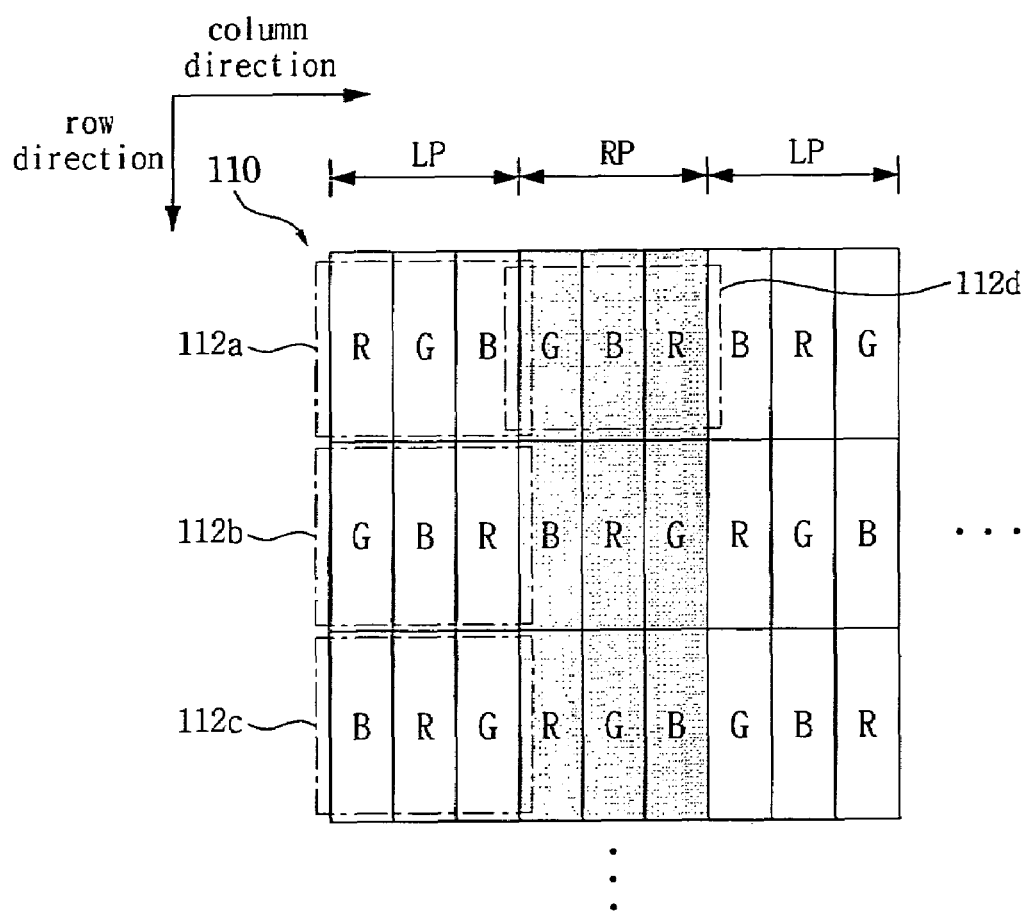
FIG. 6 is an overview illustrating an arrangement order of sub-pixels on the display panel in the 3-dimensional display device of FIG. 4 according to a first embodiment of the present invention.

Turning next to FIG. 6, which is an overview illustrating an arrangement order of sub-pixels on the display panel in the 3-dimensional display device of FIG. 4 according to a first embodiment of the present invention. As shown, at least one unit pixel 112 has R, G and B sub-pixels that are arranged differently than sub-pixels in another unit pixel 112. Further, the unit pixels are arranged in a matrix form including rows and columns.

In more detail, the R, G and B sub-pixels as shown in FIG. 6 are arranged so a sub-pixel R, G and B arranged at the leftmost side of the unit pixel 112 located in the upper left hand corner is arranged at the rightmost side of the unit pixel 112 located below (i.e., the row direction) the unit pixel 122 located in the upper left hand corner. In addition, the R, G and B sub-pixels are arranged so the sub-pixel R, G and B located in the upper left hand corner is arranged at the rightmost side of the unit pixel 112 located next to (i.e., in the column direction) the unit pixel 122 located in the upper left hand corner.

For example, the R, G and B sub-pixels are arranged so that the red sub-pixel R arranged at the leftmost side of the unit pixel 112a may be arranged at the rightmost side of the unit pixel 112b located below the unit pixel 122a in the row direction. In addition, the R, G and B sub-pixels are arranged so that the red sub-pixel R arranged at the leftmost side of the unit pixel 112a may be arranged at the rightmost side of the unit pixel 112d located next to the unit pixel 112a in the column direction.

Figure 7:
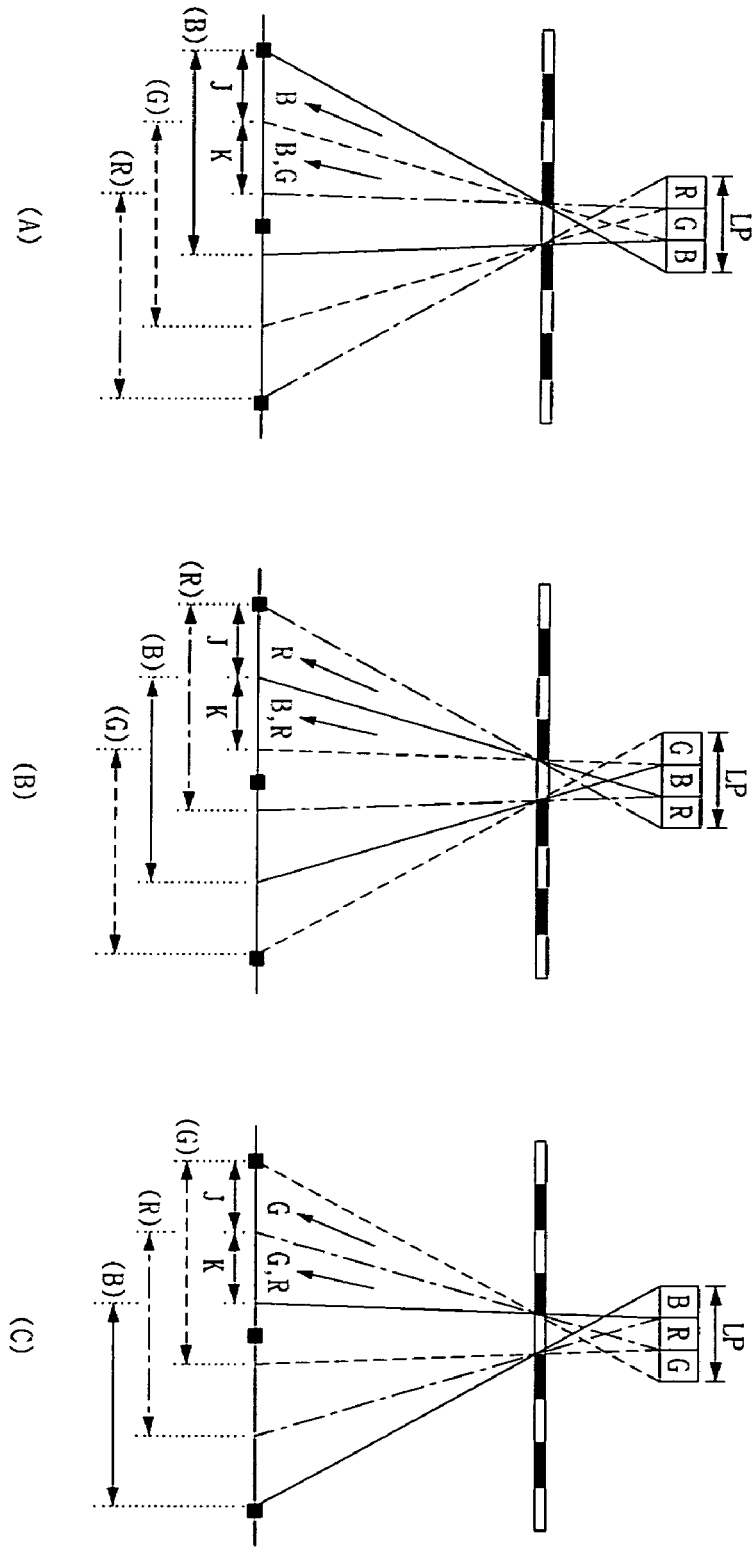
FIGS. 7(A)-7(C) are overviews illustrating a principle of reducing or eliminating the color separation phenomenon using the arrangement order of the sub-pixels in FIG. 6.

Thus, in accordance with an embodiment of the present invention, the color separation phenomenon occurring at each unit pixel 112 is reduced or eliminate because of the arrangement order of R, G and B sub-pixels shown in FIG. 6. In more detail, FIGS. 7(A)-(C) are overviews illustrating a principle of reducing or eliminating the color separation phenomenon based on the arrangement order of sub-pixels in FIG. 6. FIG. 6 will also be referred to in this description.

As shown in FIG. 7A, only a blue color exists in the 'J' section of the unit pixel 112a. Thus, because colors other than the blue color don't appear in the 'J' section of the unit pixel 112a, the color separation phenomenon occurs. In addition, only blue and green colors exist in the 'K' section of the unit pixel 112a. Thus, because colors other than the blue and green colors and a combination of the blue and green colors don't appear in the 'K' section of the unit pixel 112a, the color separation phenomenon occurs.

Similarly, as shown in FIG. 7B, the color separation phenomenon occurs at the 'J' and 'K' sections of the unit pixel 112b including the arrangement of the Green/Blue/Red sub-pixels G, B and R in the column direction. Further, as shown in FIG. 7C, the color separation phenomenon occurs at the 'J' and 'K' sections of the unit pixel 112c including the arrangement of the Blue/Red/Green sub-pixels B, R and G in the column direction.

As described above, the color separation phenomenon occurs in each of the unit pixels 112a, 112b and 112c. However, because only the blue color exists at the 'J' section of the unit pixel 112a, the red color exists at the 'J' section of the unit pixel 112b adjacent to the unit pixel 112a, and the green color exists at the 'J' section of the unit pixel 112c adjacent to the unit pixel 112b, the red, green, and blue colors all seem to exist at the 'J' section of the unit pixel 112b.

As such, the color separation phenomenon is eliminated by blending the color between the unit pixels 112a, 112b and 112c adjacent to each other. The principle of reducing or eliminating the color separation phenomenon is also applicable to the 'K' section, and applicable even to other sections not described.

Accordingly, the color separation phenomenon is reduced or eliminated in the display panel 110 for the 3-dimensional display device 100. Thus, the display quality is improved.

Figure 8:
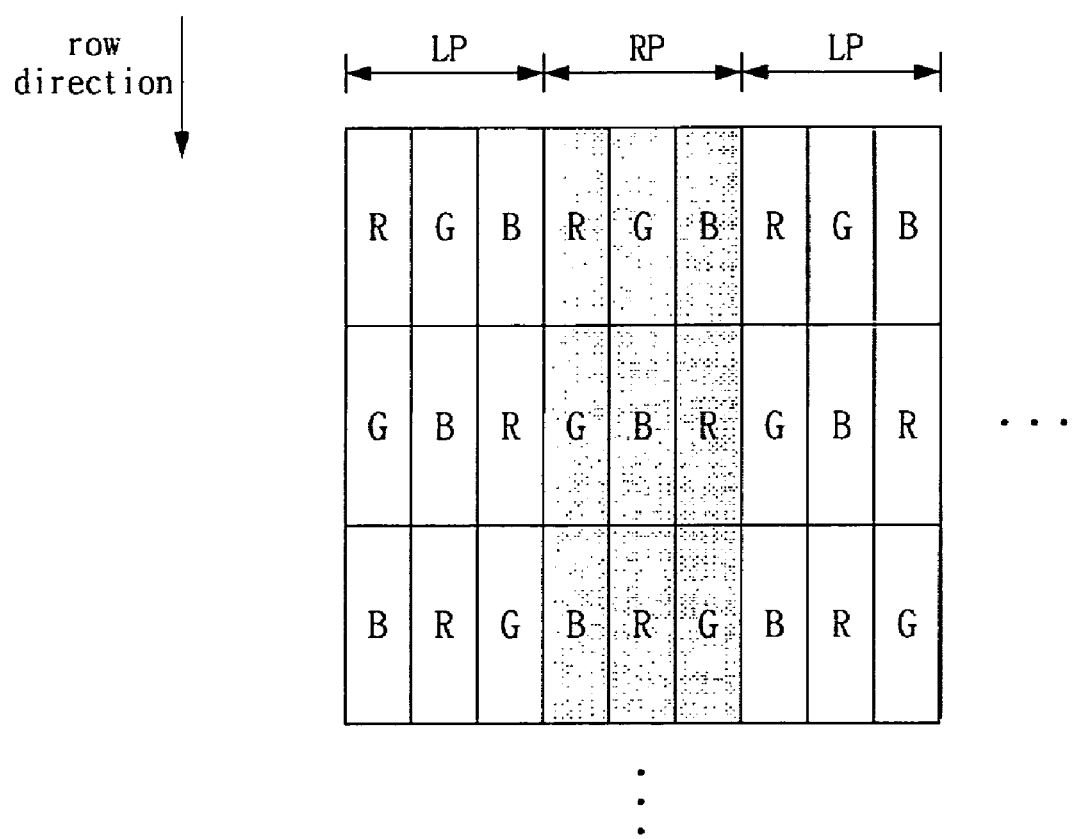
FIG. 8 is an overview illustrating an arrangement order of sub-pixels on the display panel in the 3-dimensional display device of FIG. 4 in accordance with a second embodiment of the present invention.

Turning next to FIG. 8, which is an overview illustrating an arrangement order of sub-pixels on the display panel in the 3-dimensional display device of FIG. 4 in accordance with a second embodiment of the present invention. The detailed description for the sub-pixels of FIG. 8 is similar to that of FIGS. 6 and 7, except that the sub-pixels in the unit pixel of FIG. 8 are arranged differently from one another only in the row direction.

In more detail and as shown in FIG. 8, the R, G and B sub-pixels of the display panel 110 in the display device 100 are arranged to be different from each other only in the row direction. For example, the unit pixels in the top row include an arrangement of R, G and B sub-pixels, the unit pixels in the middle row include an arrangement of G, B and R sub-pixels, and the unit pixels in the bottoms row include the arrangement of B, R and G sub-pixels. With this arrangement, the color separation phenomenon is also reduced or eliminated in the display panel 110 for the 3-dimensional display device 100.

That is, the R, G and B sub-pixels are arranged so a sub-pixel R, G and B arranged at the leftmost side of the unit pixel 112 in the top row is arranged at the rightmost side of the unit pixel 112 in the middle row adjacent to the top row. Similar comments apply to the G sub-pixel at the leftmost side of the pixel unit 112 in the middle row and the G sub-pixel at the rightmost side of the pixel unit 112 in the bottom row.

Figure 9:
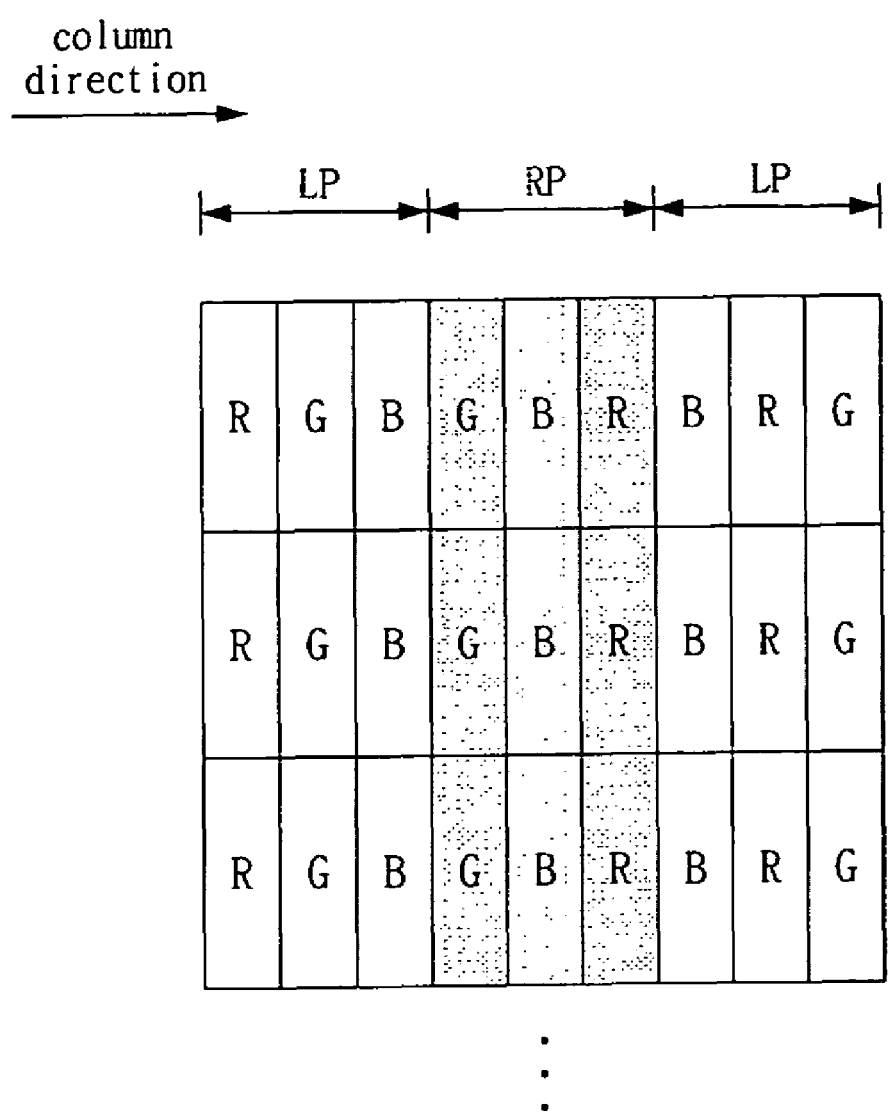
FIG. 9 is an overview illustrating an arrangement order of sub-pixels on the display panel in the 3-dimensional display device of FIG. 4 according to a third embodiment of the present invention.

Next, FIG. 9 is an overview illustrating an arrangement order of sub-pixels on the display panel in the 3-dimensional display device of FIG. 4 according to a third embodiment of the present invention. The detailed description for the sub-pixels of FIG. 9 is similar to that of FIGS. 6 and 7, except that the sub-pixels in the unit pixel of FIG. 8 are arranged differently from one another only in the column direction.

In more detail, the R, G and B sub-pixels are arranged so a sub-pixel R, G and B arranged at the leftmost side of the unit pixel 112 located at the left side in the column direction is arranged at the rightmost side of the unit pixel 112 adjacent to the left side unit pixel unit 112 in the column direction. The sub-pixels in each unit pixel 112 are also repeated in a same pattern in each row.

For example, the unit pixels in the first column (leftmost column) include an arrangement of R, G and B sub-pixels, the unit pixels in the middle column include an arrangement of G, B and R sub-pixels, and the unit pixels in the rightmost column include the arrangement of B, R and G sub-pixels. Further, the R, G and B sub-pixels are arranged in a same patter in each row (i.e., R, G and B; G, B and R; and B, R and G). With this arrangement, the color separation phenomenon is also reduced or eliminated in the display panel 110 for the 3-dimensional display device 100.

Figure 10:
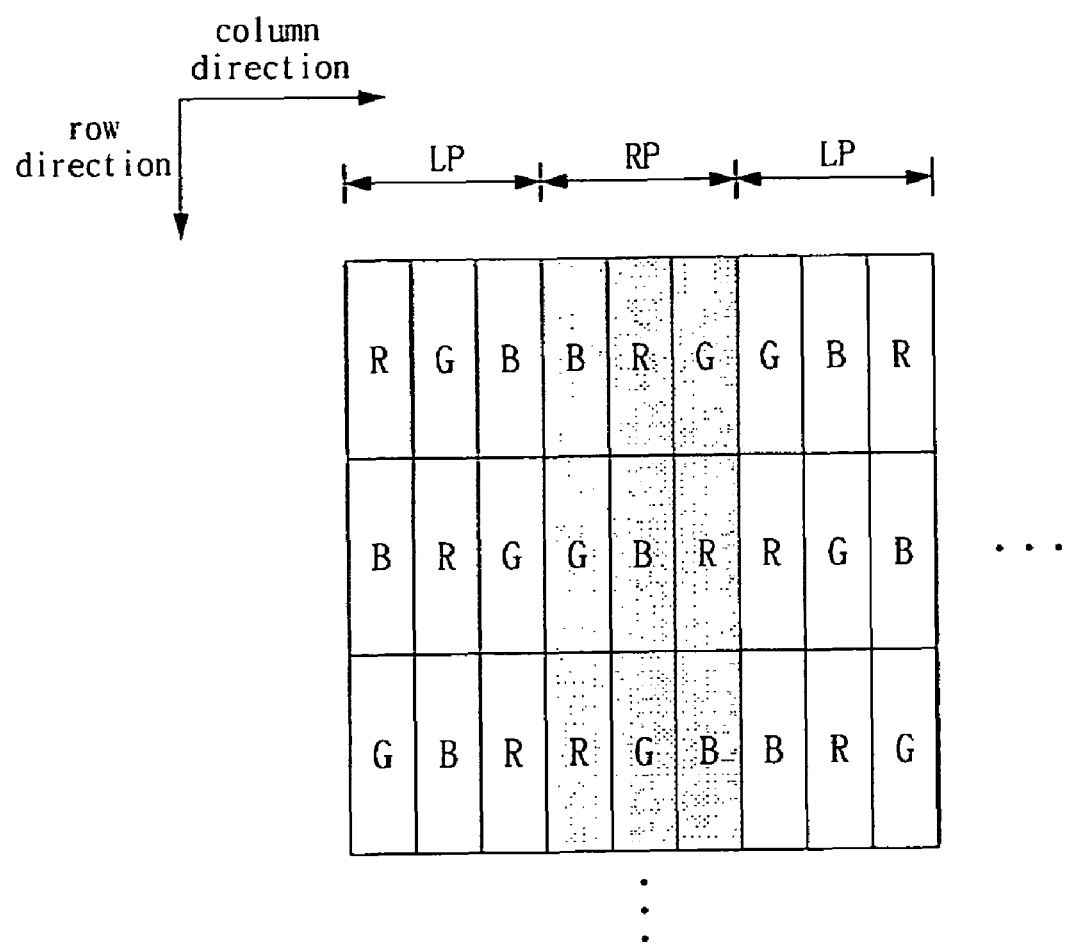
FIG. 10 is an overview illustrating an arrangement order of sub-pixels on the display panel in the 3-dimensional display device of FIG. 4 according to a fourth embodiment of the present invention.

Turning next to FIG. 10, which is an overview illustrating an arrangement order of sub-pixels on the display panel in the 3-dimensional display device of FIG. 4 in accordance with a fourth embodiment of the present invention. The detailed description for the sub-pixels of FIG. 8 is similar to that of FIGS. 6 and 7, except that the sub-pixels in the unit pixel of FIG. 10 are arranged differently from one another both the row and column directions.

In more detail and as shown in FIG. 10, the R, G and B sub-pixels of the display panel 110 in the display device 100 are arranged to be different from each other in the row and column directions. That is, the sub-pixels R, G and B are arranged so a sub-pixel R, G and B arranged at the rightmost side of the unit pixel 112 located in an upper row is arranged at the leftmost side of the unit pixel 112 located at a lower row adjacent to the upper row.

In addition, the sub-pixels R, G and B are arranged so a sub-pixel R, G and B arranged at the rightmost side of the unit pixel 112 located in a first column is arranged at the leftmost side of the unit pixel 112 located in a second column adjacent to the first column.

Figure 11:
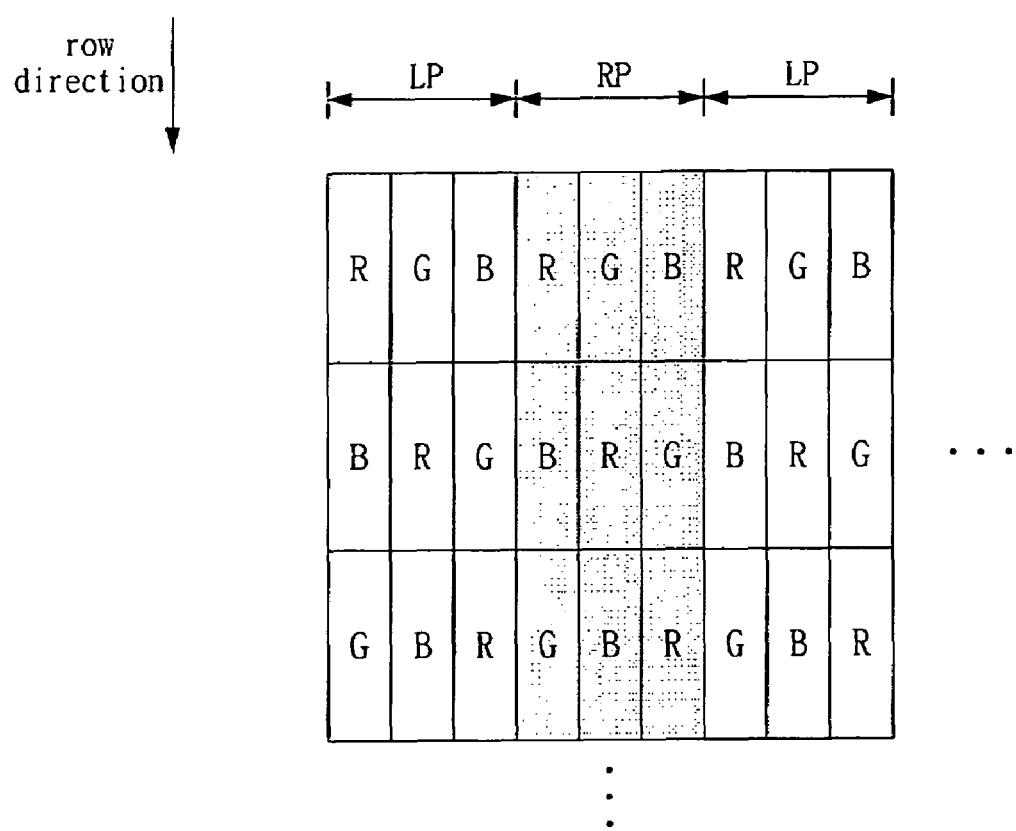
FIG. 11 is an overview illustrating an arrangement order of sub-pixels on the display panel in the 3-dimensional display device of FIG. 4 according to a fifth embodiment of the present invention.

Turning next to FIG. 11, which is an overview illustrating an arrangement order of sub-pixels on the display panel in the 3-dimensional display device of FIG. 4 in accordance with a fifth embodiment of the present invention. The arrangement in FIG. 11 is similar to the arrangement in FIG. 10, except that the R, G and B sub-pixels are repeated with the same arrangement in the column direction and arranged differently in the row direction.

In more detail, a sub-pixel R, G and B arranged at the rightmost side of the unit pixel 112 in the top row is arranged at the leftmost side of the unit pixel 112 in the middle row adjacent to the top row, and the sub-pixel R, G and B arranged at the rightmost side of the unit pixel 112 in the left column is arranged in the same manner in the unit pixel 112 in the right column adjacent to the unit pixel 112 in the left column (i.e., the R, G and B sub-pixels have the same arrangement in each column).

For example, the B sub-pixel at the rightmost side of the unit pixel 112 in the first row is arranged at the leftmost side of the pixel unit 112 in the second row adjacent to the pixel unit 112 in the first row. Also, the B sub-pixel at the rightmost side of the unit pixel 112 in the first column is arranged in the same manner in the pixel unit 112 in the second column adjacent to the pixel unit 112 in the first column. The above pattern is then repeated as appropriate.

Figure 12:
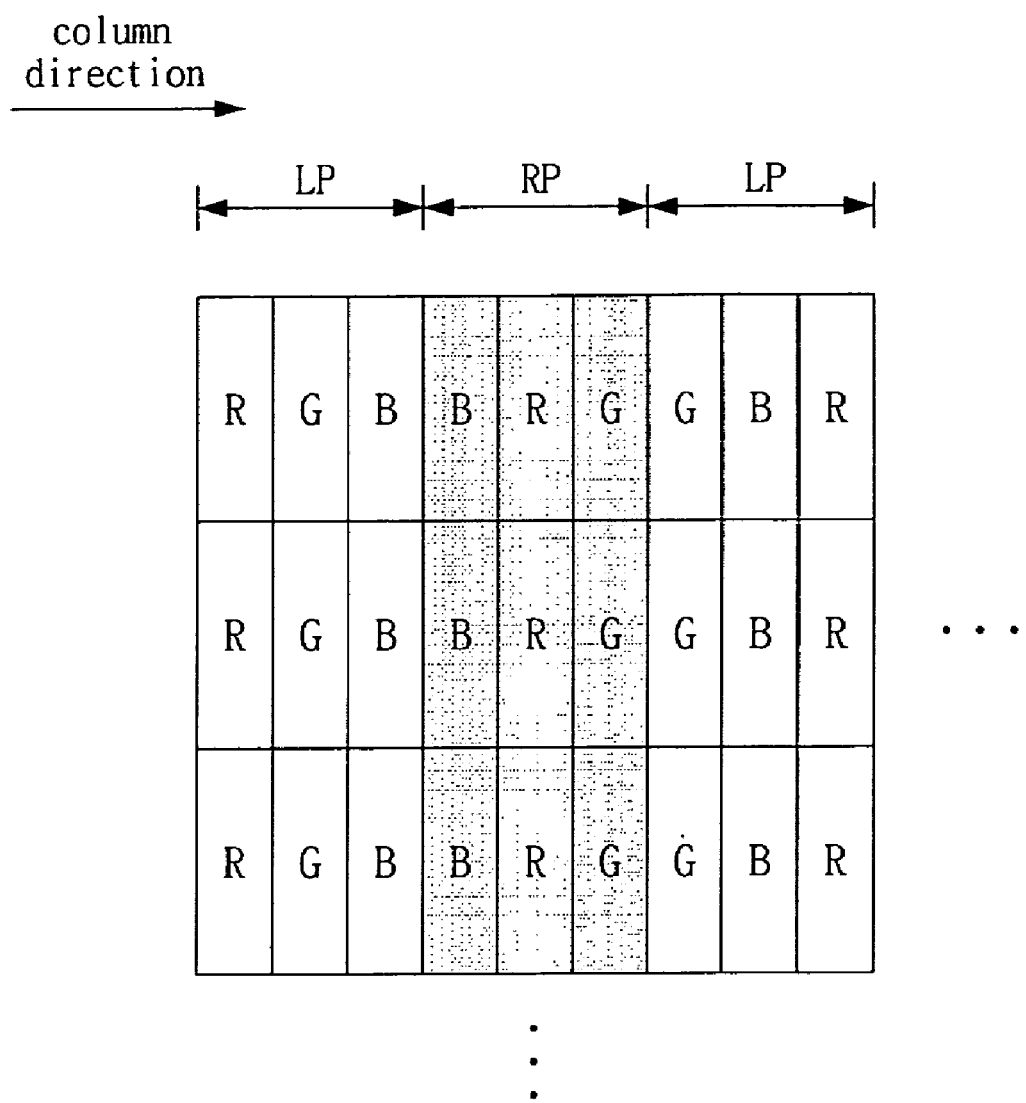
FIG. 12 is an overview illustrating an arrangement order of sub-pixels on the display panel in the 3-dimensional display device of FIG. 4 according to a sixth embodiment of the present invention.

Turning next to FIG. 12, which is an overview illustrating an arrangement order of sub-pixels on the display panel in the 3-dimensional display device of FIG. 4 in accordance with a sixth embodiment of the present invention. The arrangement in FIG. 12 is similar to the arrangement in FIGS. 9 and 10, except that the R, G and B sub-pixels are repeated with the same arrangement in the row direction and arranged differently in the column direction.

In more detail, a sub-pixel R, G and B arranged at the rightmost side of the unit pixel 112 in the first column is arranged at the leftmost side of the unit pixel 112 in the second column adjacent to the first column, and the sub-pixel R, G and B arranged at the rightmost side of the unit pixel 112 in the first row is arranged in the same manner in the unit pixel 112 in the second row adjacent to the unit pixel 112 in the left column (i.e., the R, G and B sub-pixels have the same arrangement in each row).

For example, the B sub-pixel at the rightmost side of the unit pixel 112 in the first column is arranged at the leftmost side of the pixel unit 112 in the second column adjacent to the pixel unit 112 in the first column. Also, the B sub-pixel at the rightmost side of the unit pixel 112 in the first row is arranged in the same manner in the pixel unit 112 in the second row adjacent to the pixel unit 112 in the first row. The above pattern is then repeated as appropriate.

Figure 13:
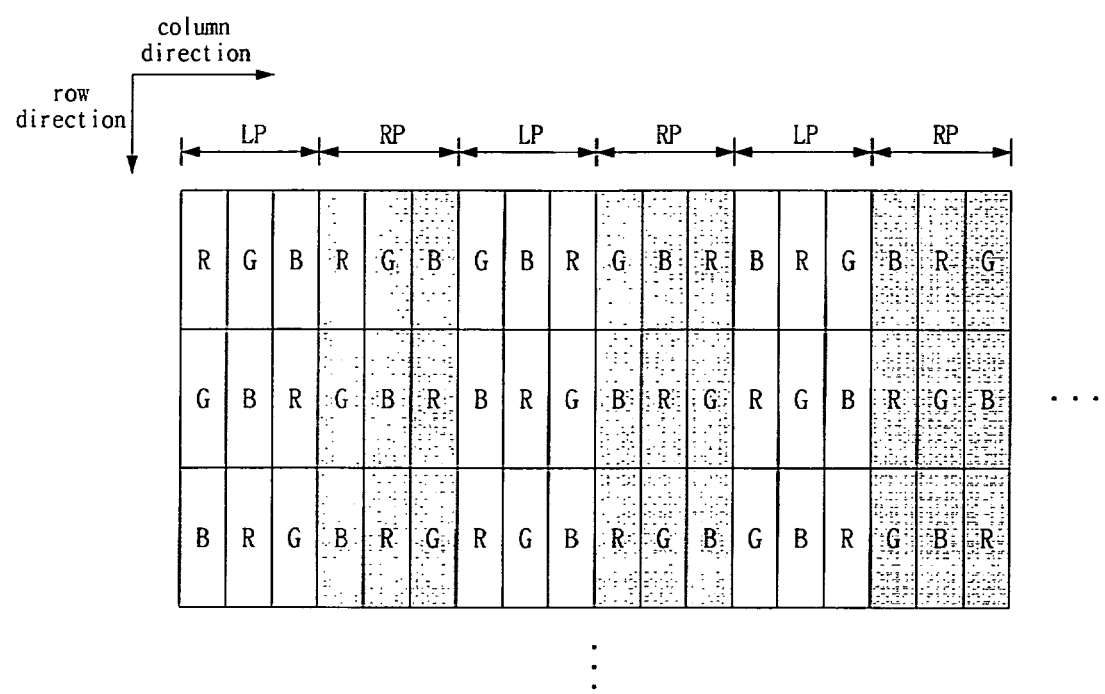
FIG. 13 is an overview illustrating an arrangement order of sub-pixels on the display panel in the 3-dimensional display device of FIG. 4 according to a seventh embodiment of the present invention.

Turning next to FIG. 13, which is an overview illustrating an arrangement order of sub-pixels on the display panel in the 3-dimensional display device of FIG. 4 in accordance with a seventh embodiment of the present invention. The detailed description for the sub-pixels of FIG. 13 is similar to that of FIGS. 6 and 7, except that the sub-pixels in the unit pixel of FIG. 13 are arranged to form pairs in the column direction.

In more detail and as shown in FIG. 13, the R, G and B sub-pixels are arranged in the first and second columns, third and fourth columns, fifth and sixth columns, etc, to form pairs of pixel units 112 for the LPs and RPs. The unit pixels 112 in the first column are also arranged in the same manner as in FIG. 6. A similar concept applies to a pair of unit pixels 122 in the row direction. With this arrangement, the color separation phenomenon is also reduced or eliminated in the display panel 110 for the 3-dimensional display device 100.

In more detail, the R, G and B sub-pixels in FIG. 13 are arranged so a R, G and B sub-pixel arranged at the leftmost side of the unit pixel 112 (LP) located in the first row is arranged at the rightmost side of the unit pixel 112 (LP) located in the second row. In addition, the R, G and B sub-pixels are arranged so a R, G and B sub-pixel arranged at the leftmost side of the unit pixel 112 (RP) located in the first row is arranged at the rightmost side of the RP located in the second row. This is similar to FIG. 6.

Further, the R, G and B sub-pixels are arranged so a R, G and B sub-pixel arranged at the leftmost side of the unit pixel 112 (LP) located in the first column (leftmost column), between which a RP is disposed, is arranged at the rightmost side of the LP located in the third column. In addition, a R, G and B sub-pixel arranged at the leftmost side of the RP located in the second column, between which an LP is disposed, is arranged at the rightmost side of the RP located in the fourth column.

Thus, as shown, the R, G and B sub-pixels in adjacent LP and RP unit pixels are arranged in the same manner to form pairs of unit pixels 112 in the row direction. Further, the R, G and B sub-pixels are arranged differently from each other in the column direction in alternating pairs as discussed above.

Figure 14:
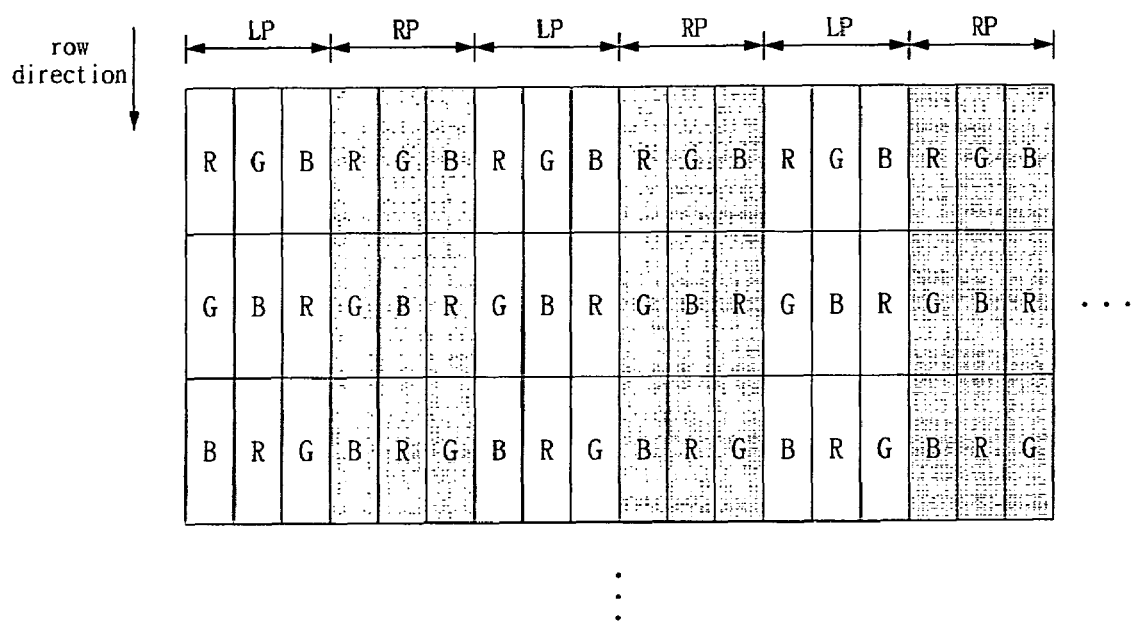
FIG. 14 is an overview illustrating an arrangement order of sub-pixels on the display panel in the 3-dimensional display device of FIG. 4 according to an eighth embodiment of the present invention.
Figure 15:
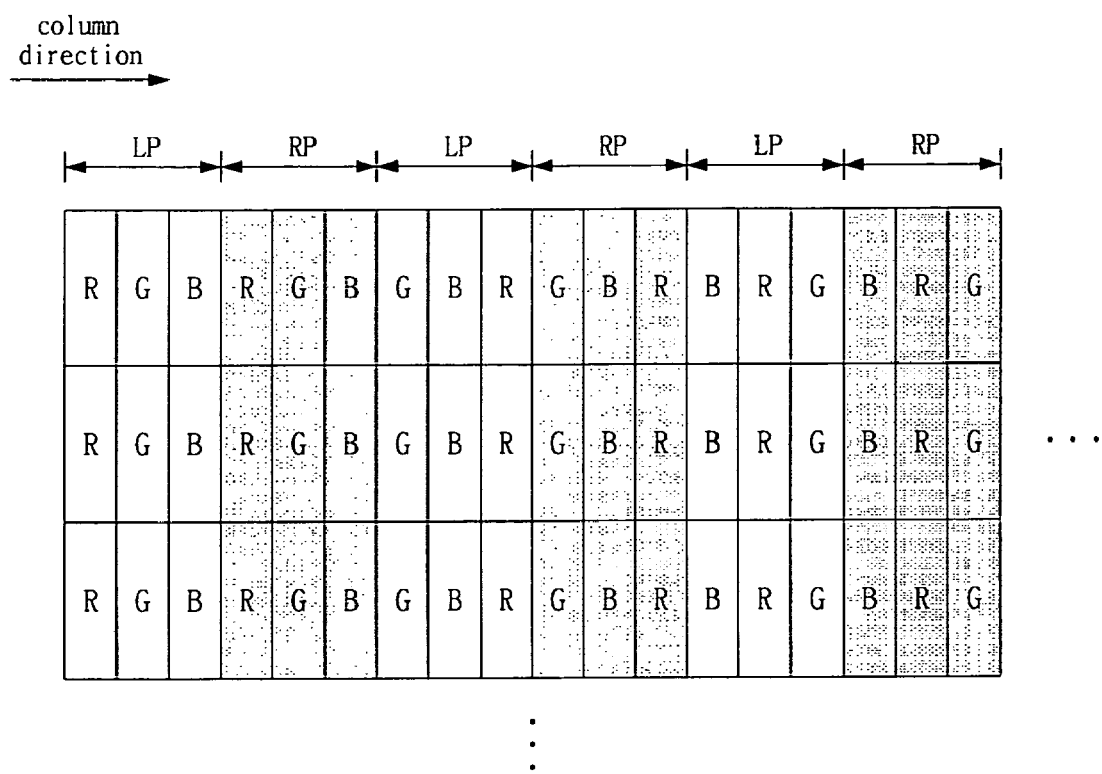
FIG. 15 is an overview illustrating an arrangement order of sub-pixels on the display panel in the 3-dimensional display device of FIG. 4 according to a ninth embodiment of the present invention.

Next, FIG. 14 illustrates an eighth embodiment of the present invention in which the R, G and B sub-pixels are arranged to be repeated only in the row direction. This is similar to FIG. 6. FIG. 15 illustrates a ninth embodiment of the present invention in which the R, G and B sub-pixels are arranged to be repeated only in the column direction. Note the LP and the RP form pairs in the column direction.

Figure 16:
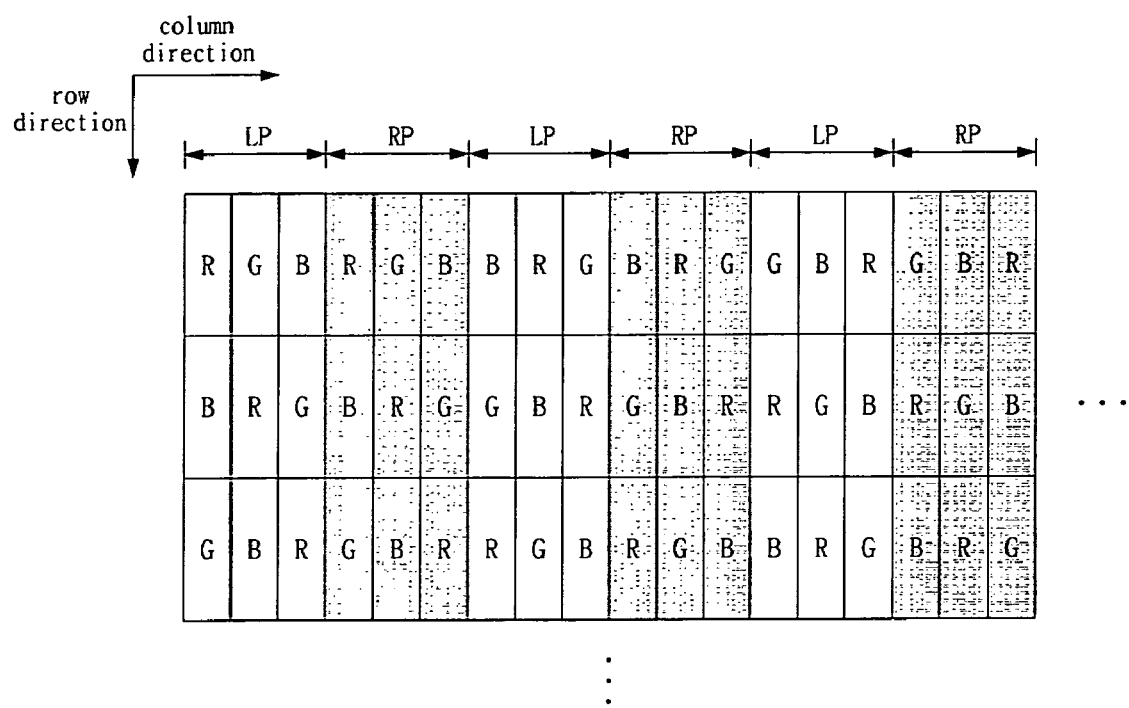
FIG. 16 is an overview illustrating an arrangement order of sub-pixels on the display panel in the 3-dimensional display device of FIG. 4 according to a tenth embodiment of the present invention.

Turning next to FIG. 16, which is an overview illustrating an arrangement order of sub-pixels on the display panel in the 3-dimensional display device of FIG. 4 in accordance with a tenth embodiment of the present invention. The detailed description for the sub-pixels of FIG. 16 is similar to that of FIG. 13, except that the sub-pixels in FIG. 16 are arranged in a different order in each pair of LPs and RPs adjacent to each other in the row direction. That is, the R, G and B sub-pixels are arranged so a sub-pixel R, G and B arranged at the rightmost side of the LP located the first row is arranged at the leftmost side of the LP located in the second row adjacent to the first row. In addition, the R, G and B sub-pixels are arranged so a sub-pixel R, G and B arranged at the rightmost side of the RP unit pixel located in the first row is arranged at the leftmost side of the RP unit pixel located in the second row (and second column).

Also, the R, G and B sub-pixels are arranged so a sub-pixel R, G and B arranged at the rightmost side of the LP located in the first column, between which a RP is disposed, is arranged at the leftmost side of the LP unit pixel located in the third column. In addition, the R, G and B sub-pixels are arranged so a sub-pixel R, G and B arranged at the rightmost side of the RP unit pixel located second column, between which an LP is disposed, is arranged at the leftmost side of the RP unit pixel located in the fourth column.

Figure 17:
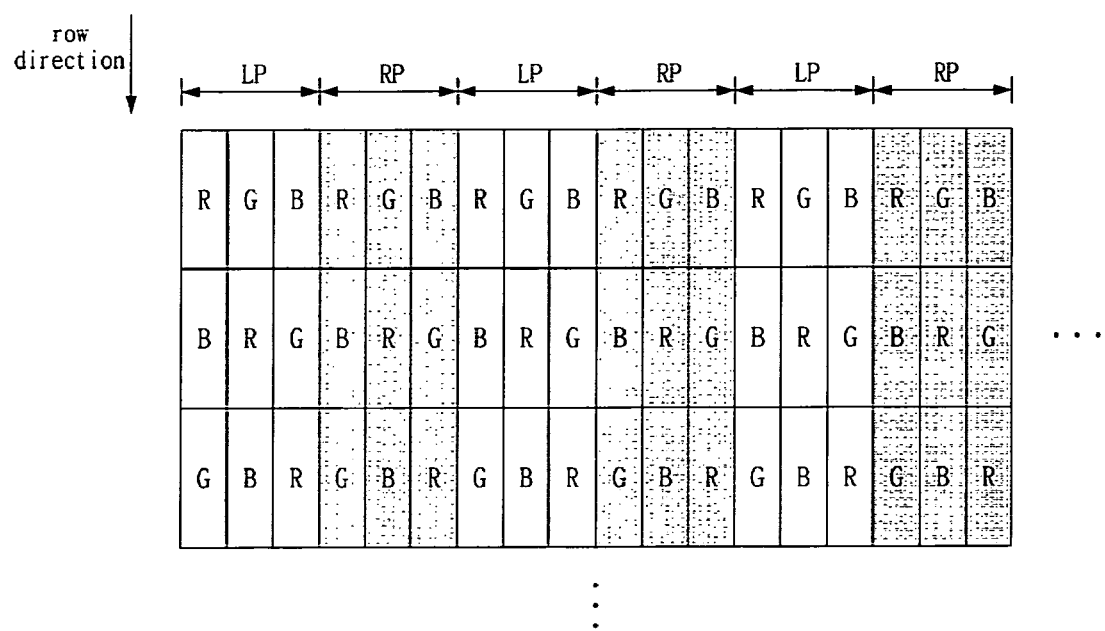
FIG. 17 is an overview illustrating an arrangement order of sub-pixels on the display panel in the 3-dimensional display device of FIG. 4 according to an eleventh embodiment of the present invention.
Figure 18:
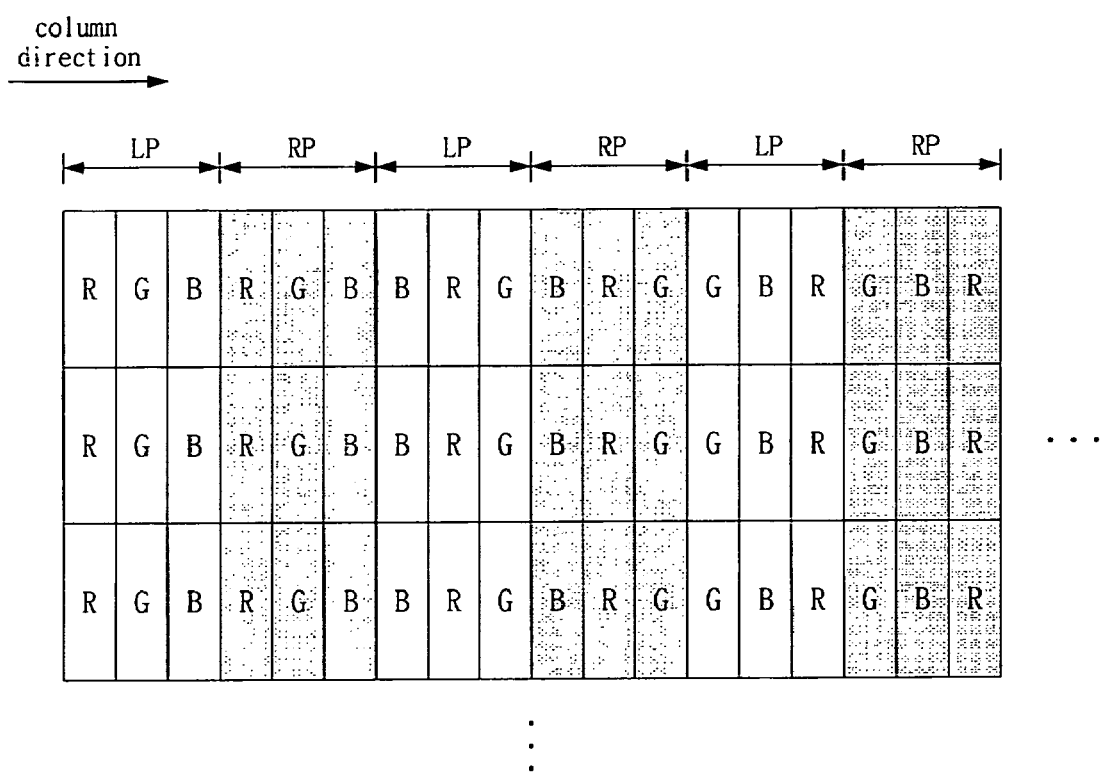
FIG. 18 is an overview illustrating an arrangement order of sub-pixels on the display panel in the 3-dimensional display device of FIG. 4 according to a twelfth embodiment of the present invention.

In addition, FIG. 17 is a twelfth embodiment, which is similar to that of FIG. 16, except that the sub-pixels of FIG. 17 are arranged repeatedly only in the column direction. Similarly, FIG. 18 is a thirteenth embodiment of the present invention and is similar to that of FIG. 16, except that the sub-pixels of FIG. 18 are arranged only in the row direction.

Figure 19A:
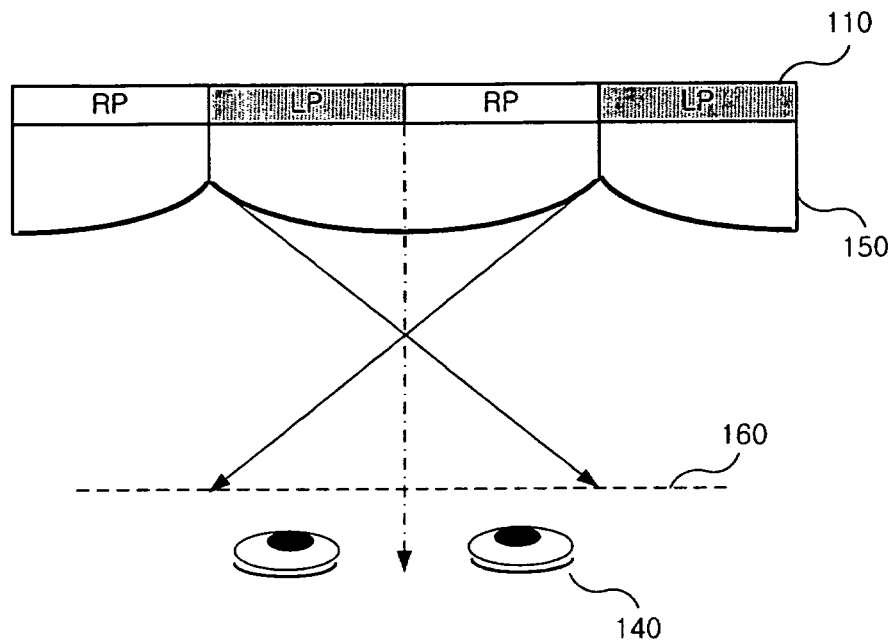
FIGS. 19A and 19B are overviews illustrating a principle of implementing a 3-dimensional image using a lenticular lens according to an embodiment of the present invention, respectively.
Figure 19B:
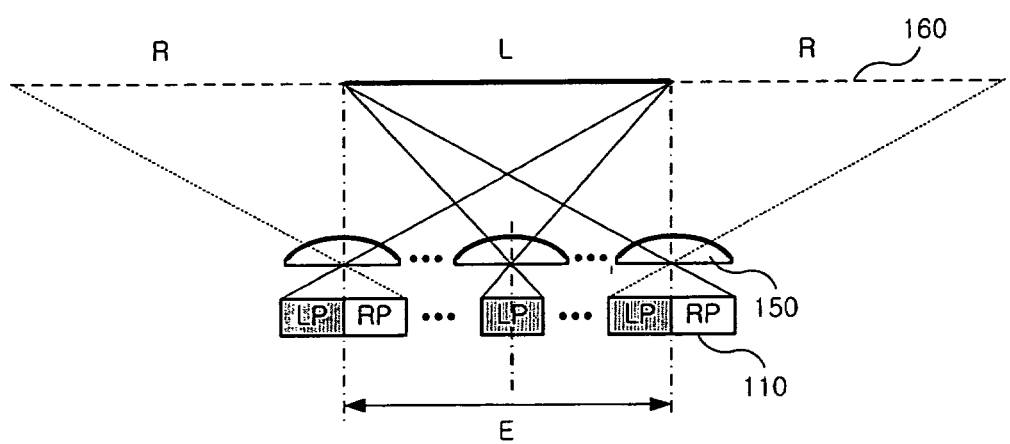

On the other hand, FIGS. 19A and 19B are overviews illustrating a principle of implementing a 3-dimensional image using a lenticular lens according to an embodiment of the present invention, respectively.

In comparison to FIG. 4, the 3-dimensional display device includes a lenticular lens 150 instead of the parallax barrier 130.

The 3-dimensional display device includes a display panel 110, a backlight unit and a lenticular lens 150. Further, the display panel 110 includes a plurality of unit pixels for displaying a 2-dimensional image using light from the backlight unit.

Referring to FIGS. 19A and 19B, each LP and RP transmits light from the backlight unit towards the viewer. Further, light that has passed through the LPs can only enter the left eye of the viewer and light that has passed through the RPs can only enter the right eye of the viewer due to the lenticular lens 150. A numeral number 160 represents a screen or a viewing zone.

In addition, the lenticular lens 150 is arranged at the front surface of the display panel. The lenticular lens 150 is used to allow the viewer to recognize the 2-dimensional image provided from the display panel as a 3-dimensional image. That is, the lenticular lens 150 allows light that has passed through the LPs to enter only the left eye and light that has passed through the RPs to enter only the right eye.

Figure 20:
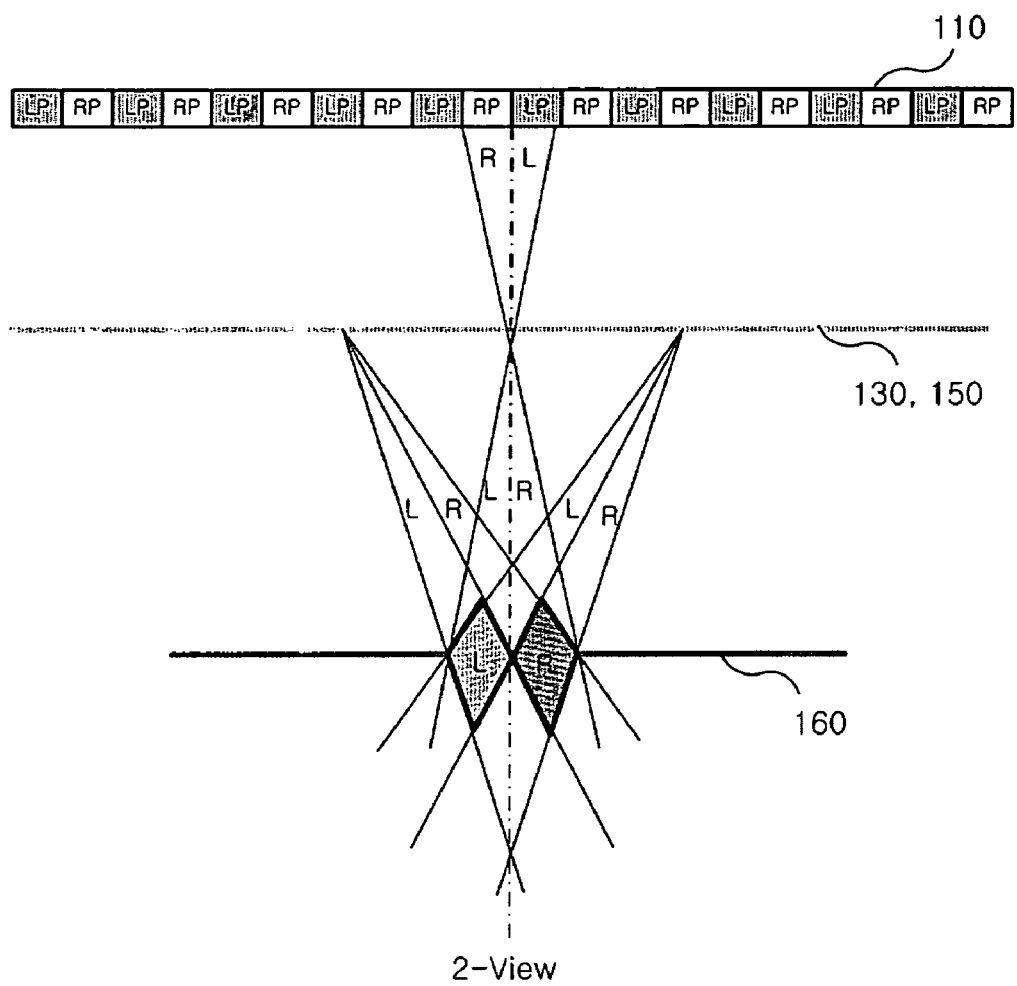
FIG. 20 is an overview illustrating 3D viewing zones areas according to an embodiment of the present invention.

FIG. 20 is an overview illustrating 3D viewing zones according to an embodiment of the present invention.

Referring to FIG. 20, the 3D image may be provided using the parallax barrier 130 or the lenticular lens 150. For example, 2-view image of an object are acquired by camera, wherein the number of views is defined by the number of cameras. Further, the 3D image may be viewed in two diamond-shaped zones on the basis of the viewing zone 160.

Figure 21:
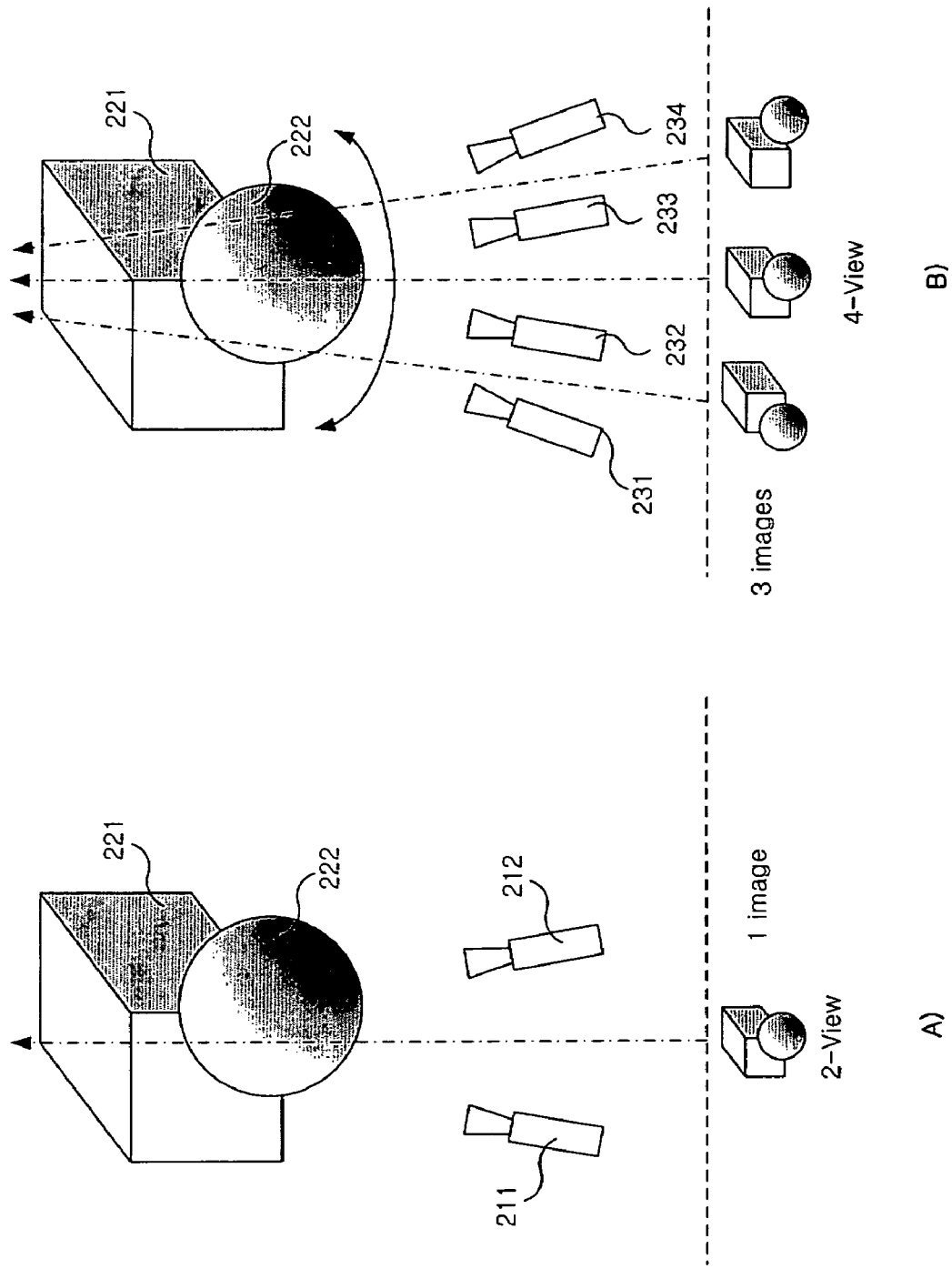
FIGS. 21(A) and (B) are overviews illustrating a 2-view 3D display and multi-view 3D display according to the present invention.

FIGS. 21(A) and (B) are overviews illustrating a 2-view and a multi-view of a 3D display according to the present invention.

Referring to FIG. 21(A), in case of 2-view, two cameras 211, 212 may capture two 2D images when an object of shooting is composed of a cube 221 and a sphere 222. Further, Referring to FIG. 21(B), in case of 4-view, four cameras 231, 232, 233, 234 may capture four 2D images when an object of shooting is composed of a cube 221 and a sphere 222. Accordingly, one 3D image is acquired by means of 2-view, and three 3D images are acquired by means of 4-view. Substantially, when the number of views increases, the width of the viewing zone may increase. As shown, the multi-view provides a kind of 3D images in comparison to the 2-view, in which the 3D images are different from each other.

As described above, the color separation phenomenon is reduced or eliminated by varying the arrangement order of the R, G and B sub-pixels in the display panel 110 for the 3-dimensional display device. Thus, the display quality is improved.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

What is claimed is:

1. A display panel for a 3-dimensional display device, the display panel comprising:
   a plurality of unit pixels arranged in a matrix form having a row and column, each unit pixel including a plurality of sub-pixels, the plurality of unit pixels being alternately arranged with pixels for a viewer's left eye and pixels for the viewer's right eye,
   wherein arrangement of sub-pixels of at least one unit pixel is different from that of another unit pixel, wherein the plurality of sub-pixels are arranged so that a sub-pixel arranged at a leftmost side of a first unit pixel is a same color as a sub-pixel arranged at a rightmost side of a second unit pixel located adjacently in a row direction of the first unit pixel and so that the sub-pixel located in at the leftmost side of the first unit pixel is a same color as a sub-pixel arranged at a rightmost side of a third unit pixel located adjacently in a column direction of the first unit pixel, wherein each of the plurality of sub-pixels has one color, and wherein colors of the plurality of sub-pixels in the unit pixel are different from each other.

2. A 3-dimensional display device comprising:

a display panel including a plurality of unit pixels arranged in a matrix form having a row and column, each unit pixel including a plurality of sub-pixels, the plurality of unit pixels being alternately arranged with pixels for a viewer's left eye and pixels for the viewer's right eye, wherein arrangement of sub-pixels of at least one unit pixel is different from that of another unit pixel, wherein each of the plurality of sub-pixels has one color, and wherein colors of the plurality of sub-pixels in the unit pixel are different from each other; and a light dispersing layer arranged in a front surface of the display panel and configured to allow light that has passed through the pixels for the viewer's left eye among light to enter only the viewer's left eye and light that has passed through the pixels for the viewer's right eye among light to enter only the right eye so that the viewer recognizes a 2-dimensional image provided from the display panel as a 3-dimensional image, wherein the plurality of sub-pixels are arranged so that a sub-pixel arranged at a leftmost side of a first unit pixel is a same color as a sub-pixel arranged at a rightmost side of a second unit pixel located adjacently in a row direction of the first unit pixel and so that the sub-pixel located in at the leftmost side of the first unit pixel is a same color as a sub-pixel arranged at a rightmost side of a third unit pixel located adjacently in a column direction of the first unit pixel.

3. The 3-dimensional display device of claim 2, wherein the light dispersing layer is one of a parallax barrier and a lenticular lens.

4. The 3-dimensional display device of claim 2, wherein the 2-dimensional image is acquired by a plurality of cameras providing 2-view image or multi-view images.

5. A method of manufacturing a display panel for a 3-dimensional display device, the display panel comprising:

arranging a plurality of unit pixels in a matrix form having a row and column, each unit pixel including a plurality of sub-pixels, the plurality of unit pixels being alternately arranged with pixels for a viewer's left eye and pixels for the viewer's right eye, wherein arrangement of sub-pixels of at least one unit pixel is different from that of another unit pixel, and wherein the arranging step arranges the plurality of sub-pixels so that a sub-pixel arranged at a leftmost side of a first unit pixel is a same color as a sub-pixel arranged at a rightmost side of a second unit pixel located adjacently in a row direction of the first unit pixel and so that the sub-pixel located in at the leftmost side of the first unit pixel is a same color as a sub-pixel arranged at a rightmost side of a third unit pixel located adjacently in a column direction of the first unit pixel, wherein each of the plurality of sub-pixels has one color, and wherein colors of the plurality of sub-pixels in the unit pixel are different from each other.

* * * * *